United States Patent
Kirch et al.

(10) Patent No.: US 10,706,420 B2
(45) Date of Patent: Jul. 7, 2020

(54) METHOD AND SYSTEM FOR FRAUD MITIGATION VIA ACCOUNT SECURITY

(71) Applicant: Mastercard International Incorporated, Purchase, NY (US)

(72) Inventors: Sean Kirch, Mahwah, NJ (US); Girish Pandey, Valhalla, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 201 days.

(21) Appl. No.: 15/370,509

(22) Filed: Dec. 6, 2016

(65) Prior Publication Data
US 2018/0158057 A1 Jun. 7, 2018

(51) Int. Cl.
*G06Q 20/40* (2012.01)
*G06Q 20/10* (2012.01)
*G06F 16/2455* (2019.01)
*G06Q 20/34* (2012.01)
*G06Q 20/22* (2012.01)
*G06Q 20/00* (2012.01)

(52) U.S. Cl.
CPC ....... *G06Q 20/401* (2013.01); *G06F 16/2455* (2019.01); *G06Q 20/00* (2013.01); *G06Q 20/102* (2013.01); *G06Q 20/227* (2013.01); *G06Q 20/3572* (2013.01); *G06Q 20/35785* (2013.01); *G06Q 20/405* (2013.01)

(58) Field of Classification Search
CPC ............................ G06Q 40/00; G06Q 20/405
See application file for complete search history.

(56) References Cited

U.S. PATENT DOCUMENTS

| | | | |
|---|---|---|---|
| 6,636,833 B1 | 10/2003 | Flitcroft et al. | |
| 7,117,172 B1* | 10/2006 | Black | G06Q 40/00 705/35 |
| 7,136,835 B1 | 11/2006 | Flitcroft et al. | |
| 7,567,934 B2 | 7/2009 | Flitcroft et al. | |
| 7,571,142 B1 | 8/2009 | Flitcroft et al. | |

(Continued)

OTHER PUBLICATIONS

Swartz, Deja Elana, "Tokens, Ledgers, and Rails: The Communication of Money", University of Southern California, Aug. 2015. (Year: 2015).*

(Continued)

*Primary Examiner* — Christopher Bridges
*Assistant Examiner* — Abdulmajeed Aziz
(74) *Attorney, Agent, or Firm* — Buchanan Ingersoll & Rooney PC

(57) ABSTRACT

A method for customized authentication of a subaccount includes: storing an account profile, wherein the account profile includes a structured data set related to a transaction account including a plurality of subaccounts, each subaccount including an associated account number, authentication rules, and authentication values; receiving a transaction message related to a payment transaction, wherein the transaction message includes a transaction account number and authentication data; identifying a specific subaccount in the account profile where the included associated account number corresponds to the transaction account number; and authenticating the authentication data based on the authentication rules and the authentication values included in the identified specific subaccount.

12 Claims, 7 Drawing Sheets

(56) References Cited

U.S. PATENT DOCUMENTS

| | | | |
|---|---|---|---|
| 7,593,896 B1 | 9/2009 | Flitcroft et al. | |
| 7,954,704 B1* | 6/2011 | Gephart | G06Q 20/3572 235/380 |
| 8,676,707 B2 | 3/2014 | Flitcroft et al. | |
| 8,756,150 B2 | 6/2014 | Flitcroft et al. | |
| 8,762,275 B2* | 6/2014 | Martino | G06Q 20/10 705/39 |
| 9,619,643 B2* | 4/2017 | Dave | H04L 63/0853 |
| 2004/0039701 A1* | 2/2004 | Nakamura | G06Q 20/04 705/42 |
| 2005/0010483 A1* | 1/2005 | Ling | G06Q 20/10 705/39 |
| 2007/0282743 A1* | 12/2007 | Lovelett | G06Q 20/10 705/40 |
| 2008/0021829 A1* | 1/2008 | Kranzley | G06Q 20/04 705/44 |
| 2009/0070260 A1 | 3/2009 | Flitcroft et al. | |
| 2009/0171805 A1* | 7/2009 | Gould | G06Q 20/40 705/26.1 |
| 2011/0010253 A1* | 1/2011 | Chenot | G06Q 20/10 705/17 |
| 2011/0087592 A1* | 4/2011 | van der Veen | G06Q 20/12 705/44 |
| 2012/0330837 A1* | 12/2012 | Persaud | G06Q 20/20 705/44 |
| 2013/0067208 A1* | 3/2013 | Brinkman | G06F 9/44505 713/1 |
| 2013/0290187 A1* | 10/2013 | Itwaru | G06Q 20/3227 705/44 |
| 2015/0120546 A1* | 4/2015 | Fernandes | G06Q 20/405 705/44 |
| 2015/0310440 A1* | 10/2015 | Hynes | G06Q 20/10 705/44 |
| 2017/0098218 A1* | 4/2017 | Rios | G06Q 20/4014 |

OTHER PUBLICATIONS

Notification of Transmittal of the International Search Report and the Written Opinion of the International Searching Authority (Forms PCT/ISA/220, PCT/ISA/210, and PCT/ISA/237) dated Jan. 2, 2018, in the corresponding International Application No. PCT/US2017/060270. (12 pages).

* cited by examiner

METHOD AND SYSTEM FOR FRAUD MITIGATION VIA ACCOUNT SECURITY

FIELD

The present disclosure relates to the customization of authentication methods for sub accounts of a transaction account, specifically the use of customized authentication rules and values to enable multiple sub accounts of a single transaction account to use different authentication for increased account security.

BACKGROUND

Account security for consumer transaction accounts is often a major focus for financial institutions that issue transaction accounts, as well as the consumers themselves. Financial institutions often try to develop new technologies and ways to protect a consumer's account. At the same time, consumers will often select a financial institution or a financial product based on the level of security provided for their transaction account. As thieves and other nefarious actors continue to develop new ways to compromise transaction accounts, consumers and financial institutions similarly are always on the lookout for new and improved ways to protect their transaction accounts.

One method that consumers and financial institutions use to protect a transaction account is requiring authentication when a payment transaction is attempted. Commonly, the consumer attempting the transaction may be required to provide a personal identification number (PIN) or a signature, which may be used during the authorization process to authenticate the consumer as an authorized user of the transaction account. Unless the thief is able to identify the consumer's PIN or adequately forge their signature, they will be unable to use the consumer's transaction account, even if their credentials are stolen or reproduced.

Another method that consumers and financial institutions sometimes use is the splitting of a transaction account into multiple sub accounts, where each sub account has separate payment credentials, such as its own credit card, and can only access an assigned portion of the balance or credit of the transaction account. Thus, if a card is stolen, the thief can only access the amount tied to that subaccount, leaving the remainder of the account unavailable. However, traditionally subaccounts operate using placeholder credentials that are mapped to the transaction account. Payment transactions are thus processed using traditional methods, which includes authentication being performed using the authentication of the transaction account. As a result, a thief that steals the credentials for multiple subaccounts may only need to figure out a single PIN or forge one signature to access all of the associated funds. As such, the compromise of a single subaccount may still place the entire transaction account at risk.

Thus, there is a need for a technological solution to enable the customization of authentication for subaccounts of a transaction account, which may result in a significant increase to account security to the benefit of both consumers and financial institutions. Such a technological solution may overcome the problems with traditional account security methods that rely on a single method of authentication that is not adjusted and cannot be customized, particularly when multiple subaccounts may be used.

SUMMARY

The present disclosure provides a description of systems and methods for customized authentication of a subaccount. As discussed herein, a consumer may set different authentication rules for different subaccounts of a transaction account, including the use of varying account values for each subaccount, such as requiring PIN and signature for one subaccount and requiring just a PIN for two other subaccounts, while the PIN required for each of the three subaccounts is different. As a result, if a single subaccount is compromised, the exposure of the other subaccounts, or the transaction account as a whole, may be unaffected due to the increased security provided, as the thief may be unaware of the authentication values necessary for accessing the other subaccounts and, in some instances, may also be unaware of even the type of authentication that is required.

A method for customized authentication of a subaccount includes: storing, in an account database of a processing server, an account profile, wherein the account profile includes a structured data set related to a transaction account including at least a plurality of subaccounts, each subaccount including at least an associated account number, one or more authentication rules, and one or more authentication values; receiving, by a receiving device of the processing server, a transaction message related to a payment transaction, wherein the transaction message is formatted based on one or more standards and includes at least a plurality of data elements including at least a first data element configured to store a transaction account number and one or more additional data elements configured to store authentication data; executing, by a querying module of the processing server, a query on the account database to identify a specific subaccount in the account profile where the included associated account number corresponds to the transaction account number; and authenticating, by an authentication module of the processing server, the authentication data based on the one or more authentication rules and the one or more authentication values included in the identified specific subaccount.

A system for customized authentication of a subaccount includes: an account database of a processing server configured to store an account profile, wherein the account profile includes a structured data set related to a transaction account including at least a plurality of subaccounts, each subaccount including at least an associated account number, one or more authentication rules, and one or more authentication values; a receiving device of the processing server configured to receive a transaction message related to a payment transaction, wherein the transaction message is formatted based on one or more standards and includes at least a plurality of data elements including at least a first data element configured to store a transaction account number and one or more additional data elements configured to store authentication data; a querying module of the processing server configured to execute a query on the account database to identify a specific subaccount in the account profile where the included associated account number corresponds to the transaction account number; and an authentication module of the processing server configured to authenticate the authentication data based on the one or more authentication rules and the one or more authentication values included in the identified specific subaccount.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
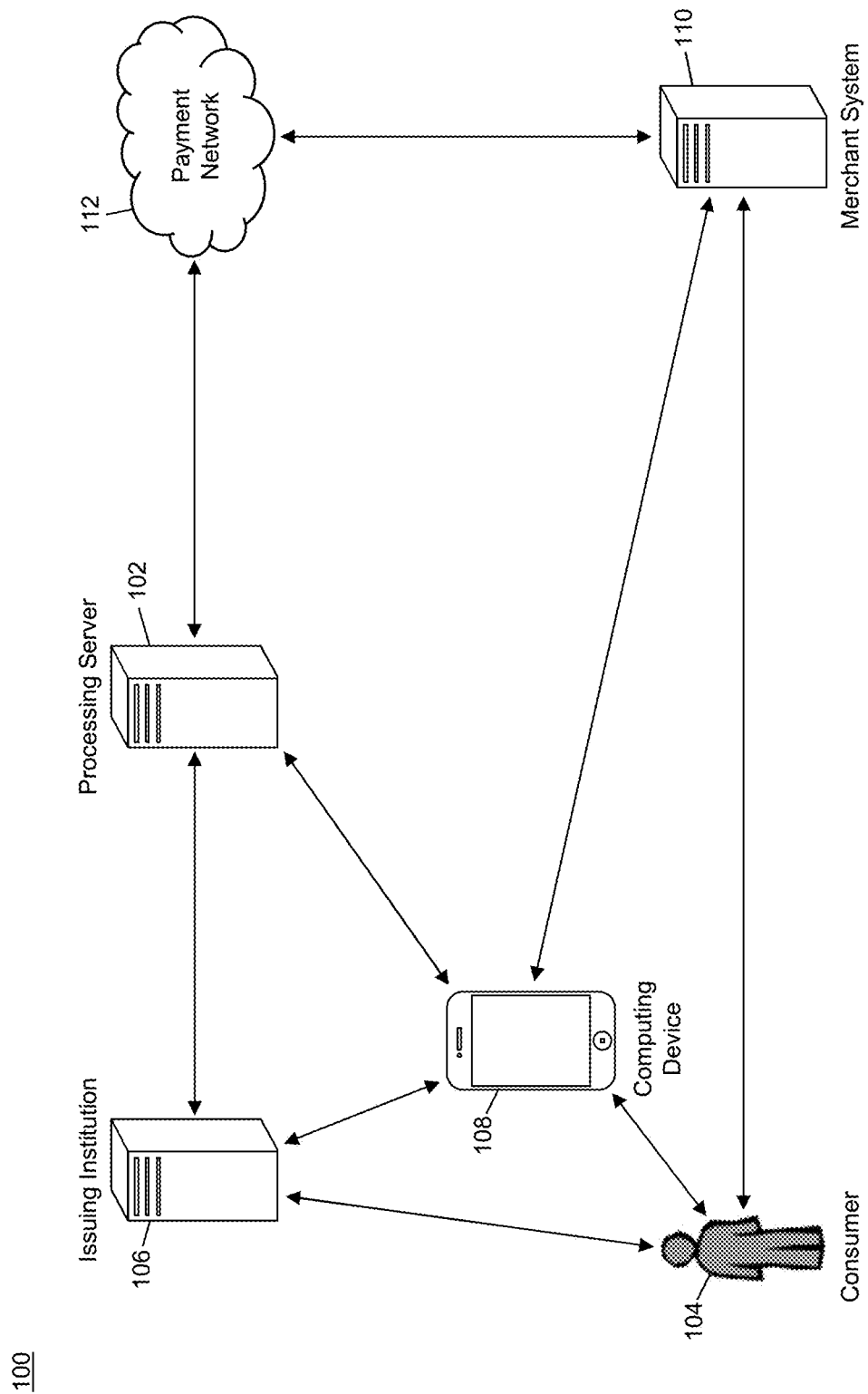
FIG. 1 is a block diagram illustrating a high level system architecture for the customized authentication of a subaccount and use thereof in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Controlled Payment Number—Controlled payment numbers may be payment numbers associated with a payment account that are subject to one or more rules. In many cases, these rules may be set by a cardholder, such as spending limits, limits on days and/or times of a transaction, limits on merchants or industries, transaction spending or frequency limits, etc. Controlled payment numbers may offer an account holder an opportunity to give payment cards tied to the account to others for use, but subject to rules set by the cardholder, such as an employer distributing cards to employees, or a parent distributing cards to children. Additional detail regarding controlled payment numbers may be found in U.S. Pat. No. 6,636,833, issued Oct. 21, 2003; U.S. Pat. No. 7,136,835, issued Nov. 14, 2006; U.S. Pat. No. 7,571,142, issued Aug. 4, 2009; U.S. Pat. No. 7,567,934, issued Jul. 28, 2009; U.S. Pat. No. 7,593,896, issued Sep. 22, 2009; U.S. patent application Ser. No. 12/219,952, filed Jul.

30, 2008; U.S. patent application Ser. No. 12/268,063, filed Nov. 10, 2008; and U.S. patent application Ser. No. 12/359,971, filed Jan. 26, 2009; each of which are herein incorporated by reference in their entirety.

System for Customized Authentication of Subaccounts

FIG. 1 illustrates a system 100 for the customized authentication of subaccounts of a transaction account, wherein each subaccount has associated authentication rules and values for use in authentication during a payment transaction involving the respective subaccount.

The system 100 may include a processing server 102. The processing server 102, discussed in more detail below, may be configured to provide for the registration of customized authentication rules and values for a subaccount of a transaction account and use thereof in authentication for a payment transaction. In the system 100, a consumer 104 may register for customized authentication for a plurality of subaccounts for a single transaction account, where payment transactions that are funded using the subaccounts must be authenticated using the respective customized authentication rules and values.

The consumer 104 may be issued a transaction account by an issuing institution 106. The issuing institution 106 may be a financial institution, such as an issuing bank, or other entity configured to issue transaction accounts to consumers 104 for use in funding payment transactions. The issuing institution 106 may issue a transaction account to the consumer 104 that is configured for the use of subaccounts, wherein subaccounts may are segments of the transaction account that have a portion of the balance, credit, etc. of the transaction account assigned thereto, such that the assigned portion may be used to fund payment transactions, but where the remainder of the balance, credit, etc. of the transaction account is unavailable for use via the subaccount. Each subaccount may be provided with its own payment credentials that, in some instances, may be unrelated to the payment credentials for other subaccounts or for the transaction account.

The payment credentials for each subaccount, and the transaction account, if applicable, may be issued to the consumer 104 using any suitable format and method, such as via a physical credit card, digital transmission to a computing device 108, etc. The computing device 108 may be a computing device associated with the consumer 104 that may be suitable for performing the functions discussed herein, such as a desktop computer, laptop computer, notebook computer, tablet computer, cellular phone, smart phone, smart watch, smart television, wearable computing device, implantable computing device, etc. The computing device 108 may be used by the consumer 104 to convey payment credentials for a subaccount to a merchant system 110 for use in a payment transaction, and/or to register subaccounts for customized authentication with the processing server 102.

To register a subaccount, the consumer 104 may, via the computing device 108 or other suitable method, provide the processing server 102 with an account identifier associated with the subaccount for which customized authentication is requested, one or more authentication rules, and one or more authentication values. The account identifier may be a unique value associated with the subaccount for use in identification thereof, such as a registration number, serial number, etc. In some instances, the account identifier may be comprised of a portion of the payment credentials associated with the subaccount, such as the primary account number.

The one or more authentication rules may be rules regarding the type of authentication that are required to authenticate the subaccount when used to fund a payment transaction. For instance, the authentication rules may indicate if a type of authentication is required, and may also include rules to specify further properties of the required authentication. For example, authentication rules for a subaccount may require the use of a PIN, the use of a signature, and may specify that the PIN is a six digit PIN. Types of authentication may include PIN, signature, biometric (e.g., fingerprint, facial scan, retinal scan, voice identification, etc.), password, and any other authentication type that will be apparent to persons having skill in the relevant art. The one or more authentication values may be data values used in the authentication of the subaccount based on the corresponding authentication rules. For instance, the authentication values may include a PIN, signature data, fingerprint data, etc.

The processing server 102 may receive the data from the consumer 104 and may register the data in an account profile associated with the transaction account, discussed in more detail below. In some embodiments, the consumer 104 may be required to provide data to authenticate the consumer 104 as a user authorized to modify the authentication settings for the transaction account, such as by supplying authentication credentials (e.g., username, email address, password, name, telephone number, etc.). In some instances, the processing server 102 may communicate with the issuing institution 106 to authenticate the consumer 104, such as by the consumer 104 supplying authentication information for their transaction account as registered with the issuing institution 106, with the issuing institution 106 confirming the consumer 104 as being authorized to modify the authentication for subaccounts of the transaction account. In some embodiments, the processing server 102 may provide the authentication rules and/or values to the issuing institution 106 as part of the registration process.

After registration, the consumer 104 may initiate a payment transaction with a merchant via a merchant system 110 associated therewith that is funded using the registered subaccount. As part of the initiation of the payment transaction, the consumer 104 may present the payment credentials associated with the subaccount to the merchant system 110 using suitable methods. In some instances, the consumer 104 may also provide authentication values using the registered authentication methods to the merchant system 110 along with the payment credentials. In other instances, the consumer 104 may wait until prompted by the merchant system 110 to provide the authentication values. In such instances, the merchant system 110 may identify the types of authentication for request from the payment credentials (e.g., as may be included therein) or from the processing server 102. For instance, the merchant system 110 may proceed with processing of the payment transaction, as discussed below, with a response provided to the merchant system 110 requesting that the consumer 104 provide the registered types of authentication.

Once the consumer 104 has initiated the payment transaction, the merchant system 110 may initiate the processing of the payment transaction by submitting transaction data for the payment transaction to a payment network 112 for processing thereof. The transaction data may include the payment credentials and authentication values supplied by the consumer 104, as well as additional data associated with the payment transaction used in the processing thereof or for additional functions related thereto, such as a transaction amount, transaction time, transaction data, geographic location, merchant name, merchant identifier, merchant category code, product data, offer data, reward data, loyalty data, issuer data, acquirer data, point of sale data, etc. In some instances, the transaction data may be transmitted directly to the payment network 112 via payment rails associated therewith. In other instances, the transaction data may be transmitted via one or more intermediate entities, such as an acquiring institution or gateway processor.

In some embodiments, the transaction data may be included in a transaction message that is electronically transmitted to the payment network 112 (e.g., by the merchant system 110 or an intermediate entity) via the payment rails associated therewith. A transaction message may be a specially formatted data message that is formatted pursuant to one or more standards governing the exchange of financial transaction messages, such as the International Organization of Standardization's ISO 8583 or ISO 20022 standards. Transaction messages may include message type indicators that are indicative of a type of the payment transaction as well as a plurality of data elements, where each data element is configured to store transaction data for the related payment transaction. In some instances, a transaction message may also include a plurality of bitmaps, which may indicate the data elements included in the transaction message and the data stored therein.

In the system 100, the merchant system 110 may (e.g., via one or more intermediate entities) submit a transaction message to the payment network 112 for the payment transaction that includes a message type indicator indicative of an authorization request and a plurality of data elements configured to store the transaction data, including at least one data element configured to store the authentication values. The payment network 112 may perform any functions associated with the processing thereof and may forward the authorization request for authorization. In some embodiments, the payment network 112 may forward the authorization request to the processing server 102 for authentication prior to approval or denial. In other embodiments, the payment network 112 may forward the authorization request to the issuing institution 106, which may electronically transmit the authorization request to the processing server 102 for authentication. In some cases, the processing server 102 may be a part of the issuing institution 106 and may receive the authorization request accordingly, such as from the payment network 112 or via internal communication of the issuing institution 104.

The processing server 102 may receive the authorization request and may authenticate the consumer 104 involved in the payment transaction based on the authentication values provided. The processing server 102 may identify the subaccount used in the payment transaction based on payment credentials parsed from the data elements included in the authorization request. The processing server 102 may then compare the authentication values parsed from the authorization request with those registered with the specific subaccount used in the payment transaction. In some embodiments, the processing server 102 may electronically transmit a result of the authentication to the issuing institution 106 for use in approving or denying the payment transaction using traditional methods. In other embodiments, the processing server 102 may only provide a successful result to the issuing institution 106. In such embodiments, if the authentication fails (e.g., the authentication values supplied by the consumer 104 to the merchant system 110 do not match the registered values), then the processing server 102 may return an authorization response (e.g., a transaction message indicated as such via the message type indicator included therein) to the payment network 112 that includes a response code indicating that the transaction is denied due to failed authentication. In instances where the payment network 112 directly transmitted the authorization request to the processing server 102, authentication results transmitted to the issuing institution 106 may be included in or accompanied by the authorization request for the payment transaction.

The issuing institution 106 may then proceed with authorization of the payment transaction based on the authentication result and authorization request using traditional methods for the authorization of a payment transaction. As part of the authorization, the issuing institution 106 may return an authorization response to the payment network 112 that includes a data element configured to store a response code that indicates approval or denial of the payment transaction. The payment network 112 may then perform any additional processes and forward the authorization response to the merchant system 110 (e.g., via one or more intermediate entities, as applicable). Additional detail regarding the traditional processing of a payment transaction is discussed in more detail below with respect to the process 600 illustrated in FIG. 6. The merchant system 110 may receive the authorization response or the indication of approval or denial and may finalize the payment transaction accordingly. In instances where the transaction was denied for failed authentication, the consumer 104 may be provided with an opportunity to resubmit the authentication values and the authorization reattempted.

In some embodiments, subaccounts may also be subject to transaction controls. Transaction controls may be controls placed on the subaccount such that transactions funded by the subaccount must be in compliance with the transaction controls to be approved. Transaction controls may include, for example, controls on transaction amount, geographic location, time, date, merchant, merchant category, products, currency type, payment type, etc. In some instances, transaction controls may be applied on a per-transaction basis, and/or may be aggregate, such as a control on aggregate spending amount over a period of time, transaction frequency over a period of time, number of transactions at a specific merchant, etc. In such embodiments, the primary account number for a subaccount may be a controlled payment number, and the authorization of payment transactions involving the subaccount may take into account the transaction controls applicable to the subaccount and the transaction data for the payment transaction, such that the payment transaction must comply with the transaction controls to be approved.

The methods and systems discussed herein may enable a consumer 104 to customize the authentication methods and values that are used when using different subaccounts of a transaction account. As a result, the consumer 104 may set up various subaccounts that each use different types of authentication and/or different authentication values, such that if the authentication values for one subaccount are compromised, the other subaccounts can remain secure. In some instances, the use of various types of authentication across subaccounts may provide for added security as a thief may be unaware of what authentication methods any particular subaccount is subject to, which may make the compromising thereof more difficult.

In addition, the customization of authentication for subaccounts may provide for added convenience to the consumer 104. For example, the consumer 104 may have a first subaccount with a small balance that is used for inexpensive, every day purchases, a second subaccount with a slightly larger balance used for larger, but still regular purchases, and a third subaccount that has a much larger balance that is rarely used and operates primarily as savings. In a balance of convenience and security, the consumer 104 may have the first subaccount require only a four-digit PIN, the second subaccount require a different four-digit PIN and a fingerprint, and the third subaccount require a six-digit PIN, the fingerprint, and a signature. Thus the customized authentication may provide for the ability for the consumer 104 to not only have increased account security, but also customize the level of security, which can be balanced with their desired convenience level in use of the respective subaccounts.

Processing Server

Figure 2:
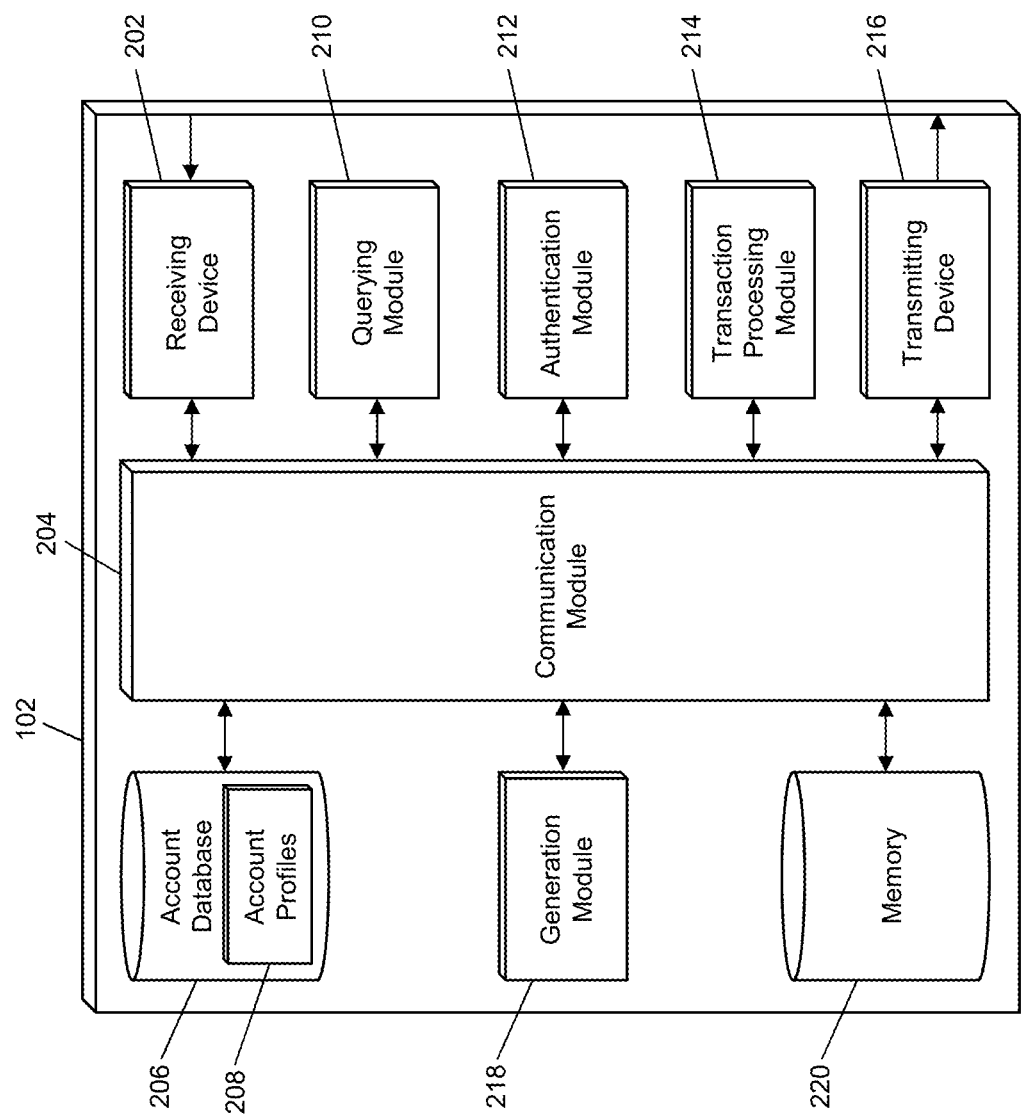
FIG. 2 is a block diagram illustrating the processing server of the system of FIG. 1 for the customized authentication of a subaccount in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 700 illustrated in FIG. 7 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 112 for the transmission of transaction messages that include sensitive financial data and information. In some instances, the receiving device 202 may also be configured to receive data from issuing institutions 106, computing devices 108, merchant systems 110, payment networks 112, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 108, which may be superimposed or otherwise encoded with registration data used to register a subaccount for customized authentication, which may include an account identifier, one or more authentication rules, and one or more authentication values. The receiving device 202 may also be configured to receive transaction messages from payment networks 112 using payment rails associated therewith and/or from issuing institutions 106 using external or internal communication networks and methods. In some embodiments, the receiving device 202 may be configured to receive data signals electronically transmitted by merchant systems 110, which may request authentication rules and/or authentication types and may include an account identifier associated with a subaccount presented for use in a payment transaction.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 210, authentication module 212, transaction processing module 214, generation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a transaction account. Each account profile 208 may include at least a plurality of subaccounts, where each subaccount includes at least an associated account number, one or more authentication rules, and one or more authentication values. In some instances, each subaccount may also include an account identifier, which may be separate from the associated account number. In some cases, the account number may be a controlled payment number.

The processing server 102 may include a querying module 210. The querying module 210 may be configured to execute queries on databases to identify information. The querying module 210 may receive one or more data values or query strings, and may execute a query string based thereon on an indicated database, such as the account database 206, to identify information stored therein. The querying module 210 may then output the identified information to an appropriate engine or module of the processing server 102 as necessary. The querying module 210 may, for example, execute a query on the account database 206 to identify an account profile 208 to which an authorization request corresponds based on the inclusion of the primary account number included in the authorization request in the account database 206 as a subaccount's associated account number.

The processing server 102 may also include an authentication module 212. The authentication module 212 may be configured to perform authentications, which may include the comparison of two sets of data values with the authentication being based on the comparison. The authentication module 212 may receive data to be authenticated as input, may perform the authentication, and may output a result of the authentication to another module or engine of the processing server 102. In some instances, the authentication module 212 may receive data to which the provided data is authenticated as part of the input. In other instances, the authentication module 212 may be configured to identify the data. For example, the authentication module 212 may be configured to authenticate authentication values parsed from a received authorization request, which may be compared against previously stored authentication values, where the authentication module 212 may submit an instruction to the querying module 210 to execute a query on the account database 206 to identify authentication values in an account profile 208 for a subaccount matching the primary account number included in the authorization request.

The processing server 102 may also include a transaction processing module 214. The transaction processing module 214 may be configured to perform functions of the processing server 102 related to the processing of payment transactions. For example, the transaction processing module 214 may be configured to determine approval or denial of a payment transaction based on data included in an authorization request and other data (e.g., account balances, credit limits, fraud scores, etc.). The transaction processing module 214 may also be configured to generate or modify transaction messages for use in processing payment transactions. Additional functions performed by the transaction processing module 214 will be apparent to persons having skill in the relevant art.

The processing server 102 may also include a generation module 218. The generation module 218 may be configured to generate data for use in performing the functions of the processing server 102 as discussed herein. The generation module 218 may receive instructions as input, may generate data based on the received instructions, and may output the generated data to another module or engine of the processing server 102. For example, the generation module 218 may be configured to generate subaccount numbers, such as in instances where the processing server 102 may be used to create subaccounts in addition to registering customized authentication rules and values.

The processing server 102 may also include a transmitting device 216. The transmitting device 216 may be configured to transmit data over one or more networks via one or more network protocols. In some embodiments, the transmitting device 216 may be configured to transmit data over the payment rails, such as using specially configured infrastructure associated with payment networks 112 for the transmission of transaction messages that include sensitive financial data and information, such as identified payment credentials. In some instances, the transmitting device 216 may be configured to transmit data to issuing institutions 104, computing devices 108 merchant systems 110, payment networks 112, and other entities via alternative networks, such as the Internet. In some embodiments, the transmitting device 216 may be comprised of multiple devices, such as different transmitting devices for transmitting data over different networks, such as a first transmitting device for transmitting data over the payment rails and a second transmitting device for transmitting data over the Internet. The transmitting device 216 may electronically transmit data signals that have data superimposed that may be parsed by a receiving computing device. In some instances, the transmitting device 216 may include one or more modules for superimposing, encoding, or otherwise formatting data into data signals suitable for transmission.

The transmitting device 216 may be configured to electronically transmit data signals to issuing institutions 106 using internal or external communication networks and methods that may be superimposed or otherwise encoded with authentication results. In some instances, such signals may also include authorization requests for payment transactions, as applicable. The transmitting device 216 may also be configured to electronically transmit authorization responses and other transaction messages to payment networks 112 via payment rails associated therewith. In some embodiments, the transmitting device 216 may be configured to electronically transmit data signals to merchant systems 110 that are superimposed or otherwise encoded with authentication rules or data associated therewith, such as indicating the types of authentication values that should be requested from the consumer 104.

The processing server 102 may also include a memory 220. The memory 220 may be configured to store data for use by the processing server 102 in performing the functions discussed herein, such as public and private keys, symmetric keys, etc. The memory 220 may be configured to store data using suitable data formatting methods and schema and may be any suitable type of memory, such as read-only memory, random access memory, etc. The memory 220 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 220 may be comprised of or may otherwise include a relational database that utilizes structured query language for the storage, identification, modifying, updating, accessing, etc. of structured data sets stored therein.

Process for Customization of Subaccount Authentication

Figure 3:
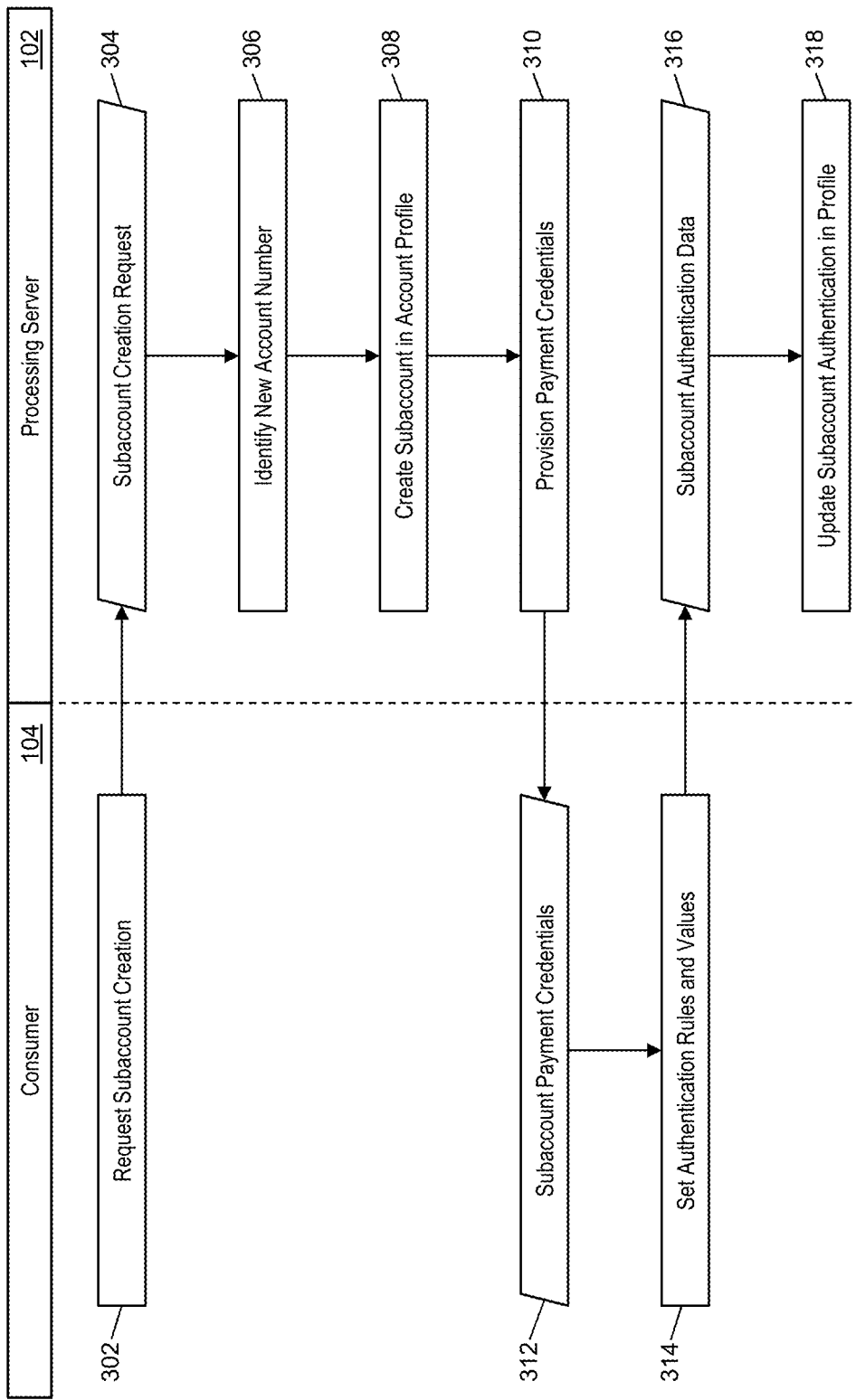
FIG. 3 is a flow diagram illustrating a process for the creation of subaccounts and registration of customized authentication methods thereof using the system of FIG. 1 in accordance with exemplary embodiments.

FIG. 3 illustrates a process for the registration of customized authentication for a subaccount in the system 100 illustrated in FIG. 1.

In step 302, the consumer 104 may (e.g., via the computing device 108 or other suitable method) request the creation of a subaccount for a specific transaction account. In step 304, the receiving device 202 of the processing server 102 may receive the request, where the request may include at least a primary account number or other identifier associated with the transaction account. In some instances, the request may also include authentication credentials, which the processing server 102 may use to ensure that the consumer 104 is authorized to create subaccounts for that transaction account. In such instances, the authentication may be performed by the processing server 102 or by the issuing institution 106.

In step 306, the generation module 218 of the processing server 102 may generate a new account number to associate with the new subaccount being created. In some embodiments, the new account number may be a controlled payment number, where the consumer 104 may be able to set transaction controls for the subaccount. In step 308, the querying module 210 of the processing server 102 may execute a query on the account database 206 of the processing server 102 to insert a new subaccount in the account profile 208 associated with the transaction account (e.g., as identified via the account identifier included in the request).

The new subaccount may include at least the new account number generated in step 308.

In step 310, the transmitting device 216 of the processing server 102 may electronically transmit the new account number to the consumer 104 via any suitable method. For instance, in a first example, the processing server 102 may electronically transmit payment credentials that include the new account number and any additional credentials (e.g., expiration date, security code, cryptograms, etc.) to a computing device 108 for storage therein, such as via an electronic wallet application program. In a second example, a physical payment card that includes a magnetic strip encoded with the new account number and any additional credentials may be distributed to the consumer 104. In a third example, the consumer 104 may be provided with a physical payment card that includes an integrated circuit chip that stores payment credentials for electronic transmission to a point of sale. In step 312, the consumer 104 may receive the credentials for the newly created subaccount.

In step 314, the consumer 104 may (e.g., via the computing device 108) set authentication rules and authentication values for the new subaccount. In some embodiments, the consumer 104 may, via the computing device 108, set the authentication rules and values via a user interface, such as may be presented via a web page or application program associated with the processing server 102. For example, the consumer 104 may visit a web page that may use drop down menus, sliders, radio buttons, checkboxes, and other input methods to enable the consumer 104 to identify one or more authentication rules and one or more authentication values. The authentication data may be submitted to the processing server 102 using a suitable communication network and method, and received by the receiving device 202 of the processing server 102, in step 316. In step 318, the querying module 210 of the processing server 102 may execute a query on the account database 206 to insert the one or more authentication rules and one or more authentication values in the subaccount created in the account profile 208 for the transaction account.

Process for Authentication of a Subaccount

Figure 4:
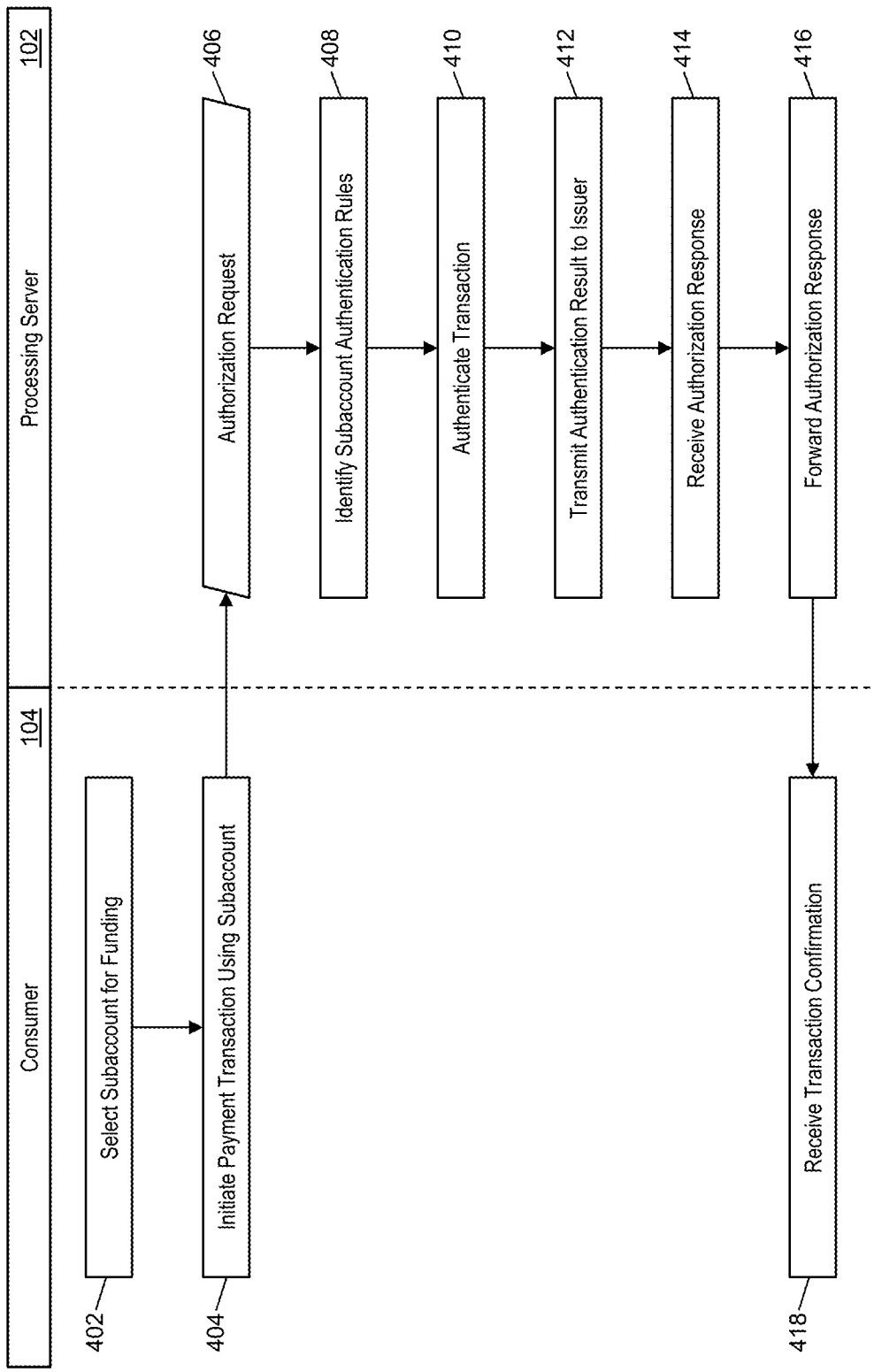
FIG. 4 is a flow diagram illustrating a process for the use of customized authentication in the processing of a payment transaction in the system of FIG. 1 in accordance with exemplary embodiments.

FIG. 4 illustrates a process for the authentication of a payment transaction involving a subaccount for which customized authentication has been registered in the system 100 of FIG. 1.

In step 402, the consumer 104 may select a subaccount to use to fund a payment transaction. In instances where physical payment instruments may be used, the consumer 104 may select a physical payment instrument, such as a credit card, issued for the subaccount. In instances where an electronic wallet application may be used, such as may be executed by the computing device 108, the consumer 104 may select a specific subaccount among the plurality of subaccounts that have been created by the consumer 104. In step 404, the consumer 104 may initiate a payment transaction to be funded by the selected subaccount, which may comprise providing the payment instrument to the merchant system 110 and one or more authentication values.

In step 406, the processing server 102 may receive an authorization request for the payment transaction initiated by the consumer 104. The authorization request may be received from the payment network 112 via the associated payment rails or from the issuing institution 106 using a suitable communication network and method and may include at least the account number and any other payment credentials for the selected subaccount and the one or more authentication values supplied by the consumer 104. In step 408, the querying module 210 of the processing server 102 may execute a query on the account database 206 to identify an account profile 208 that includes the selected subaccount based on the associated account numbers included therein and the account number included in the received authorization request.

In step 410, the authentication module 212 of the processing server 102 may authenticate the payment transaction. Authentication may include a comparison of the one or more authentication values that are parsed from the authorization request with the authentication values included in the selected subaccount in the identified account profile 208. In step 412, the transmitting device 216 of the processing server 102 may electronically transmit the authorization request and the result of the authentication to the issuing institution 106 for authorization. In some instances, the authentication result may be inserted into a corresponding data element included in the authorization request prior to forwarding to the issuing institution 106. In step 414, the processing server 102 may receive an authorization response from the issuing institution 104, which may include a data element configured to store a response code that indicates if the payment transaction is approved or declined.

In step 416, the transmitting device 216 of the processing server 102 may electronically transmit the authorization response to the payment network 112 via the payment rails associated therewith. In step 418, the consumer 104 may receive confirmation of the payment transaction. In instances where the payment transaction was approved, the confirmation may comprise a receipt provided by the merchant system 110 or may comprise the transacted-for goods or services. In instances where the payment transaction was declined, the confirmation may comprise a notification (e.g., display via the merchant system 110 or computing device 108) that the transaction was declined. In instances where the transaction was declined due to failed authorization, the consumer 104 may be notified and provided an opportunity to resubmit the authentication values to reattempt authentication.

Exemplary Method for Customized Authentication of a Subaccount

Figure 5:
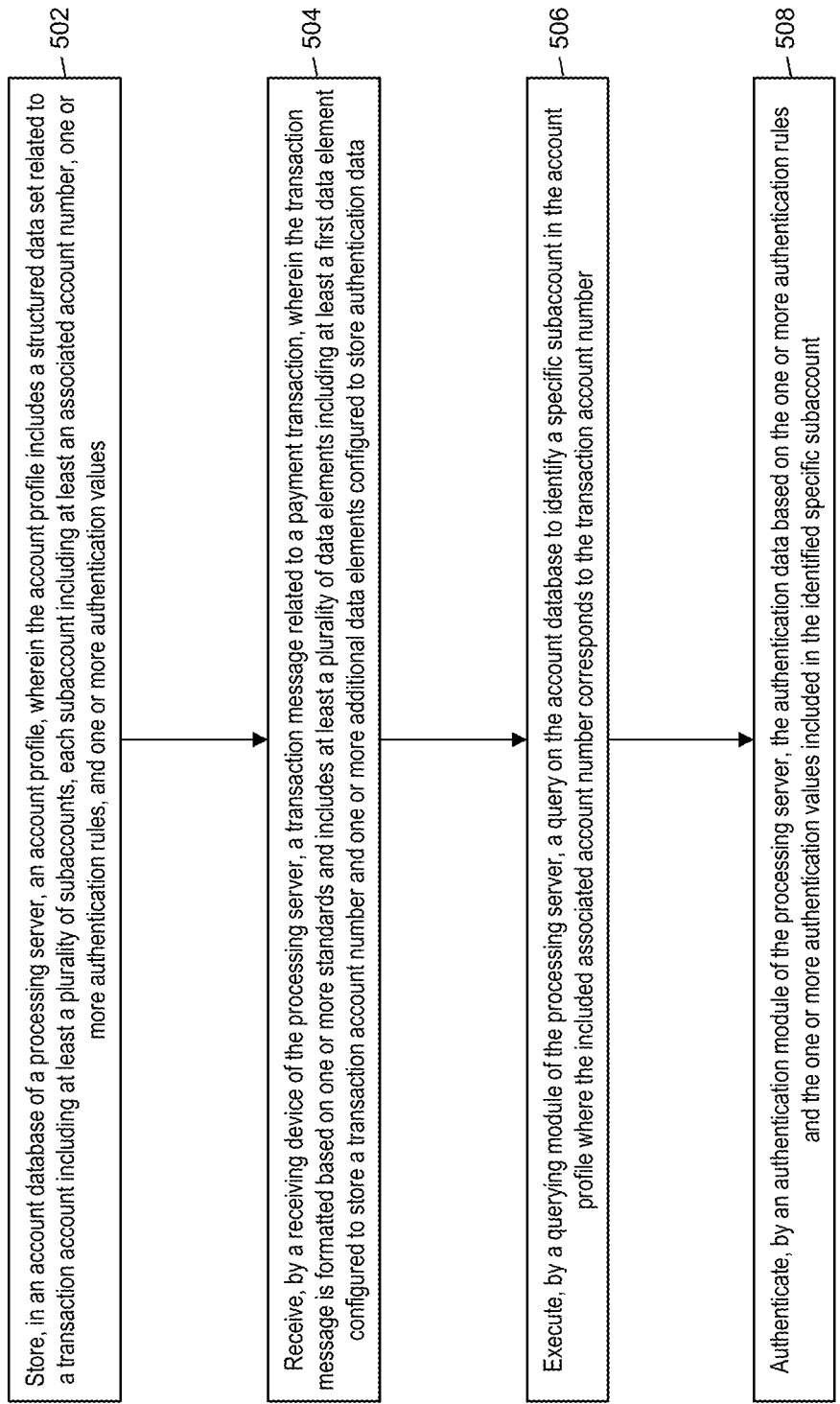
FIG. 5 is a flow chart illustrating an exemplary method for customized authentication of a subaccount in accordance with exemplary embodiments.

FIG. 5 illustrates a method 500 for the authentication of a payment transaction involving a subaccount that utilizes customized authentication.

In step 502, an account profile (e.g., account profile 208) may be stored in an account database (e.g., the account database 206) of a processing server (e.g., the processing server 102), wherein the account profile includes a structured data set related to a transaction account including at least a plurality of subaccounts, each subaccount including at least an associated account number, one or more authentication rules, and one or more authentication values. In step 504, a transaction message related to a payment transaction may be received by a receiving device (e.g., the receiving device 202) of the processing server, wherein the transaction message is formatted based on one or more standards and includes at least a plurality of data elements including at least a first data element configured to store a transaction account number and one or more additional data elements configured to store authentication data.

In step 506, a query may be executed on the account database by a querying module (e.g., the querying module 210) of the processing server to identify a specific subaccount in the account profile where the included associated account number corresponds to the transaction account number. In step 508, the authentication data may be authenticated by an authentication module (e.g., the authentication module 212) of the processing server based on the one or more authentication rules and the one or more authentication values included in the identified specific subaccount.

In one embodiment, the method 500 may further include electronically transmitting, by a transmitting device (e.g., the transmitting device 216) of the processing server, a result of the authentication to a financial institution (e.g., the issuing institution 106) associated with the related transaction account. In a further embodiment, the result of the authentication may be stored in a data element of the plurality of data elements included in the transaction message, and electronic transmission of the result of the authentication may comprise electronically transmitting the transaction message to the financial institution.

In some embodiments, the method 500 may also include: determining, by a transaction processing module (e.g., the transaction processing module 214) of the processing server, approval or denial of the related payment transaction based on at least a result of the authentication; and electronically transmitting, by a transmitting device of the processing server, a second transaction message, wherein the second transaction message is formatted based on the one or more standards and includes a plurality of data elements including at least a first data element configured to store a response code, the response code being based on the determined approval or denial. In a further embodiment, the specific subaccount may further include a plurality of transaction controls, the plurality of data elements included in the received transaction message may further include additional data elements configured to store transaction data, and the approval or denial of the related payment transaction may be further based on a correspondence between the plurality of transaction controls and the transaction data. In another further embodiment, the transaction message may be received from a payment network (e.g., the payment network 112), and the second transaction message may be electronically transmitted to the payment network.

In one embodiment, the method 500 may further include: receiving, by the receiving device of the processing server, a subaccount creation request, wherein the subaccount creation request further includes an account identifier, one or more authentication rules, and one or more authentication values; identifying, by the processing server, a subaccount number; and executing, by the querying module of the processing server, a query on the account database to insert a new subaccount including the identified subaccount number and the one or more authentication rules and one or more authentication values included in the received subaccount creation request, wherein the account profile further includes the account identifier. In a further embodiment, the method 500 may even further include electronically transmitting, by a transmitting device of the processing server, at least the identified subaccount number in response to the received subaccount creation request. In another further embodiment, identifying the subaccount number may include executing, by the querying module of the processing server, a query on a memory of the processing server to identify an unused account number as the subaccount number. In yet another further embodiment, identifying the subaccount number may include generating, by a generation module (e.g., the generation module 218) of the processing server, the subaccount number.

Payment Transaction Processing System and Process

Figure 6:
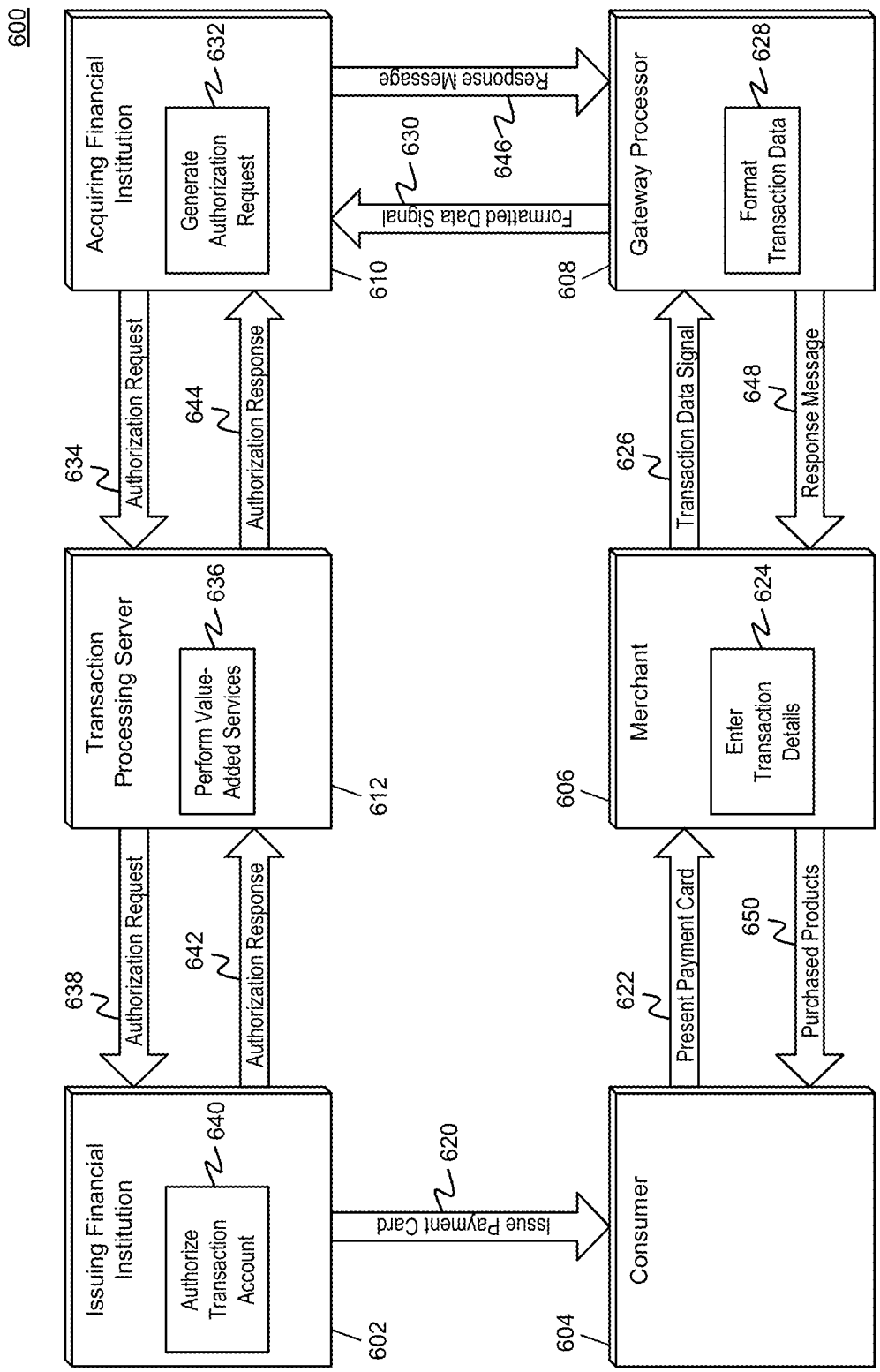
FIG. 6 is a flow diagram illustrating the processing of a payment transaction in accordance with exemplary embodiments.

FIG. 6 illustrates a transaction processing system and a process 600 for the processing of payment transactions in the system, which may include the processing of thousands, millions, or even billions of transactions during a given period (e.g., hourly, daily, weekly, etc.). The process 600 and steps included therein may be performed by one or more components of the system 100 discussed above, such as the processing server 102, issuing institution 104, consumer 104, computing device 108, merchant system 110, payment network 112, etc. The processing of payment transactions using the system and process 600 illustrated in FIG. 6 and discussed below may utilize the payment rails, which may be comprised of the computing devices and infrastructure utilized to perform the steps of the process 600 as specially configured and programmed by the entities discussed below, including the transaction processing server 612, which may be associated with one or more payment networks configured to processing payment transactions. It will be apparent to persons having skill in the relevant art that the process 600 may be incorporated into the processes illustrated in FIGS. 3-5, discussed above, with respect to the step or steps involved in the processing of a payment transaction. In addition, the entities discussed herein for performing the process 600 may include one or more computing devices or systems configured to perform the functions discussed below. For instance, the merchant 606 may be comprised of one or more point of sale devices, a local communication network, a computing server, and other devices configured to perform the functions discussed below.

In step 620, an issuing financial institution 602 may issue a payment card or other suitable payment instrument to a consumer 604. The issuing financial institution may be a financial institution, such as a bank, or other suitable type of entity that administers and manages payment accounts and/or payment instruments for use with payment accounts that can be used to fund payment transactions. The consumer 604 may have a transaction account with the issuing financial institution 602 for which the issued payment card is associated, such that, when used in a payment transaction, the payment transaction is funded by the associated transaction account. In some embodiments, the payment card may be issued to the consumer 604 physically. In other embodiments, the payment card may be a virtual payment card or otherwise provisioned to the consumer 604 in an electronic format.

In step 622, the consumer 604 may present the issued payment card to a merchant 606 for use in funding a payment transaction. The merchant 606 may be a business, another consumer, or any entity that may engage in a payment transaction with the consumer 604. The payment card may be presented by the consumer 604 via providing the physical card to the merchant 606, electronically transmitting (e.g., via near field communication, wireless transmission, or other suitable electronic transmission type and protocol) payment details for the payment card, or initiating transmission of payment details to the merchant 606 via a third party. The merchant 606 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 624, the merchant 606 may enter transaction details into a point of sale computing system. The transaction details may include the payment details provided by the consumer 604 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 606 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 606 may be an online retailer in an e-commerce transaction. In such embodiments, the transaction details may be entered in a shopping cart or other repository for storing transaction data in an electronic transaction as will be apparent to persons having skill in the relevant art.

In step 626, the merchant 606 may electronically transmit a data signal superimposed with transaction data to a gateway processor 608. The gateway processor 608 may be an entity configured to receive transaction details from a merchant 606 for formatting and transmission to an acquiring financial institution 610. In some instances, a gateway processor 608 may be associated with a plurality of merchants 606 and a plurality of acquiring financial institutions 610. In such instances, the gateway processor 608 may receive transaction details for a plurality of different transactions involving various merchants, which may be forwarded on to appropriate acquiring financial institutions 610. By having relationships with multiple acquiring financial institutions 610 and having the requisite infrastructure to communicate with financial institutions using the payment rails, such as using application programming interfaces associated with the gateway processor 608 or financial institutions used for the submission, receipt, and retrieval of data, a gateway processor 608 may act as an intermediary for a merchant 606 to be able to conduct payment transactions via a single communication channel and format with the gateway processor 608, without having to maintain relationships with multiple acquiring financial institutions 610 and payment processors and the hardware associated thereto. Acquiring financial institutions 610 may be financial institutions, such as banks, or other entities that administers and manages payment accounts and/or payment instruments for use with payment accounts. In some instances, acquiring financial institutions 610 may manage transaction accounts for merchants 606. In some cases, a single financial institution may operate as both an issuing financial institution 602 and an acquiring financial institution 610.

The data signal transmitted from the merchant 606 to the gateway processor 608 may be superimposed with the transaction details for the payment transaction, which may be formatted based on one or more standards. In some embodiments, the standards may be set forth by the gateway processor 608, which may use a unique, proprietary format for the transmission of transaction data to/from the gateway processor 608. In other embodiments, a public standard may be used, such as the International Organization for Standardization's ISO 6663 standard. The standard may indicate the types of data that may be included, the formatting of the data, how the data is to be stored and transmitted, and other criteria for the transmission of the transaction data to the gateway processor 608.

In step 628, the gateway processor 608 may parse the transaction data signal to obtain the transaction data superimposed thereon and may format the transaction data as necessary. The formatting of the transaction data may be performed by the gateway processor 608 based on the proprietary standards of the gateway processor 608 or an acquiring financial institution 610 associated with the payment transaction. The proprietary standards may specify the type of data included in the transaction data and the format for storage and transmission of the data. The acquiring financial institution 610 may be identified by the gateway processor 608 using the transaction data, such as by parsing the transaction data (e.g., deconstructing into data elements) to obtain an account identifier included therein associated with the acquiring financial institution 610. In some instances, the gateway processor 608 may then format the transaction data based on the identified acquiring financial institution 610, such as to comply with standards of formatting specified by the acquiring financial institution 610. In some embodiments, the identified acquiring financial institution 610 may be associated with the merchant 606 involved in the payment transaction, and, in some cases, may manage a transaction account associated with the merchant 606.

In step 630, the gateway processor 608 may electronically transmit a data signal superimposed with the formatted transaction data to the identified acquiring financial institution 610. The acquiring financial institution 610 may receive the data signal and parse the signal to obtain the formatted transaction data superimposed thereon. In step 632, the acquiring financial institution may generate an authorization request for the payment transaction based on the formatted transaction data. The authorization request may be a specially formatted transaction message that is formatted pursuant to one or more standards, such as the ISO 6663 standard and standards set forth by a payment processor used to process the payment transaction, such as a payment network. The authorization request may be a transaction message that includes a message type indicator indicative of an authorization request, which may indicate that the merchant 606 involved in the payment transaction is requesting payment or a promise of payment from the issuing financial institution 602 for the transaction. The authorization request may include a plurality of data elements, each data element being configured to store data as set forth in the associated standards, such as for storing an account number, application cryptogram, transaction amount, issuing financial institution 602 information, etc.

In step 634, the acquiring financial institution 610 may electronically transmit the authorization request to a transaction processing server 612 for processing. The transaction processing server 612 may be comprised of one or more computing devices as part of a payment network configured to process payment transactions. In some embodiments, the authorization request may be transmitted by a transaction processor at the acquiring financial institution 610 or other entity associated with the acquiring financial institution. The transaction processor may be one or more computing devices that include a plurality of communication channels for communication with the transaction processing server 612 for the transmission of transaction messages and other data to and from the transaction processing server 612. In some embodiments, the payment network associated with the transaction processing server 612 may own or operate each transaction processor such that the payment network may maintain control over the communication of transaction messages to and from the transaction processing server 612 for network and informational security.

In step 636, the transaction processing server 612 may perform value-added services for the payment transaction. Value-added services may be services specified by the issuing financial institution 602 that may provide additional value to the issuing financial institution 602 or the consumer 604 in the processing of payment transactions. Value-added services may include, for example, fraud scoring, transaction or account controls, account number mapping, offer redemption, loyalty processing, etc. For instance, when the transaction processing server 612 receives the transaction, a fraud score for the transaction may be calculated based on the data included therein and one or more fraud scoring algorithms and/or engines. In some instances, the transaction processing server 612 may first identify the issuing financial institution 602 associated with the transaction, and then identify any services indicated by the issuing financial institution 602 to be performed. The issuing financial institution 602 may be identified, for example, by data included in a specific data element included in the authorization request, such as an issuer identification number. In another example, the issuing financial institution 602 may be identified by the primary account number stored in the authorization request, such as by using a portion of the primary account number (e.g., a bank identification number) for identification.

In step 638, the transaction processing server 612 may electronically transmit the authorization request to the issuing financial institution 602. In some instances, the authorization request may be modified, or additional data included in or transmitted accompanying the authorization request as a result of the performance of value-added services by the transaction processing server 612. In some embodiments, the authorization request may be transmitted to a transaction processor (e.g., owned or operated by the transaction processing server 612) situated at the issuing financial institution 602 or an entity associated thereof, which may forward the authorization request to the issuing financial institution 602.

In step 640, the issuing financial institution 602 may authorize the transaction account for payment of the payment transaction. The authorization may be based on an available credit amount for the transaction account and the transaction amount for the payment transaction, fraud scores provided by the transaction processing server 612, and other considerations that will be apparent to persons having skill in the relevant art. The issuing financial institution 602 may modify the authorization request to include a response code indicating approval (e.g., or denial if the transaction is to be denied) of the payment transaction. The issuing financial institution 602 may also modify a message type indicator for the transaction message to indicate that the transaction message is changed to be an authorization response. In step 642, the issuing financial institution 602 may transmit (e.g., via a transaction processor) the authorization response to the transaction processing server 612.

In step 644, the transaction processing server 612 may forward the authorization response to the acquiring financial institution 610 (e.g., via a transaction processor). In step 646, the acquiring financial institution may generate a response message indicating approval or denial of the payment transaction as indicated in the response code of the authorization response, and may transmit the response message to the gateway processor 608 using the standards and protocols set forth by the gateway processor 608. In step 648, the gateway processor 608 may forward the response message to the merchant 606 using the appropriate standards and protocols. In step 660, assuming the transaction was approved, the merchant 606 may then provide the products purchased by the consumer 604 as part of the payment transaction to the consumer 604.

In some embodiments, once the process 600 has completed, payment from the issuing financial institution 602 to the acquiring financial institution 610 may be performed. In some instances, the payment may be made immediately or within one business day. In other instances, the payment may be made after a period of time, and in response to the submission of a clearing request from the acquiring financial institution 610 to the issuing financial institution 602 via the transaction processing server 612. In such instances, clearing requests for multiple payment transactions may be aggregated into a single clearing request, which may be used by the transaction processing server 612 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 640), the transaction processing server 612 may be configured to perform authorization of transactions on behalf of the issuing financial institution 602. Such actions may be referred to as "stand-in processing," where the transaction processing server "stands in" as the issuing financial institution 602. In such instances, the transaction processing server 612 may utilize rules set forth by the issuing financial institution 602 to determine approval or denial of the payment transaction, and may modify the transaction message accordingly prior to forwarding to the acquiring financial institution 610 in step 644. The transaction processing server 612 may retain data associated with transactions for which the transaction processing server 612 stands in, and may transmit the retained data to the issuing financial institution 602 once communication is reestablished. The issuing financial institution 602 may then process transaction accounts accordingly to accommodate for the time of lost communication.

In another example, if the transaction processing server 612 is unavailable for submission of the authorization request by the acquiring financial institution 610, then the transaction processor at the acquiring financial institution 610 may be configured to perform the processing of the transaction processing server 612 and the issuing financial institution 602. The transaction processor may include rules and data suitable for use in making a determination of approval or denial of the payment transaction based on the data included therein. For instance, the issuing financial institution 602 and/or transaction processing server 612 may set limits on transaction type, transaction amount, etc. that may be stored in the transaction processor and used to determine approval or denial of a payment transaction based thereon. In such instances, the acquiring financial institution 610 may receive an authorization response for the payment transaction even if the transaction processing server 612 is unavailable, ensuring that transactions are processed and no downtime is experienced even in instances where communication is unavailable. In such cases, the transaction processor may store transaction details for the payment transactions, which may be transmitted to the transaction processing server 612 (e.g., and from there to the associated issuing financial institutions 602) once communication is reestablished.

In some embodiments, transaction processors may be configured to include a plurality of different communication channels, which may utilize multiple communication cards and/or devices, to communicate with the transaction processing server 612 for the sending and receiving of transaction messages. For example, a transaction processor may be comprised of multiple computing devices, each having multiple communication ports that are connected to the transaction processing server 612. In such embodiments, the transaction processor may cycle through the communication channels when transmitting transaction messages to the transaction processing server 612, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 610 may identify that an authorization request involves an issuing financial institution 602 (e.g., via the bank identification number included in the transaction message) for which no value-added services are required. The transaction processor at the acquiring financial institution 610 may then transmit the authorization request directly to the transaction processor at the issuing financial institution 602 (e.g., without the authorization request passing through the transaction processing server 612), where the issuing financial institution 602 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 612 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 608, acquiring financial institution 610, etc.) for processing using this advanced network, and to quickly and efficiently receive a response regarding the ability for a consumer 604 to fund the payment transaction.

Computer System Architecture

Figure 7:
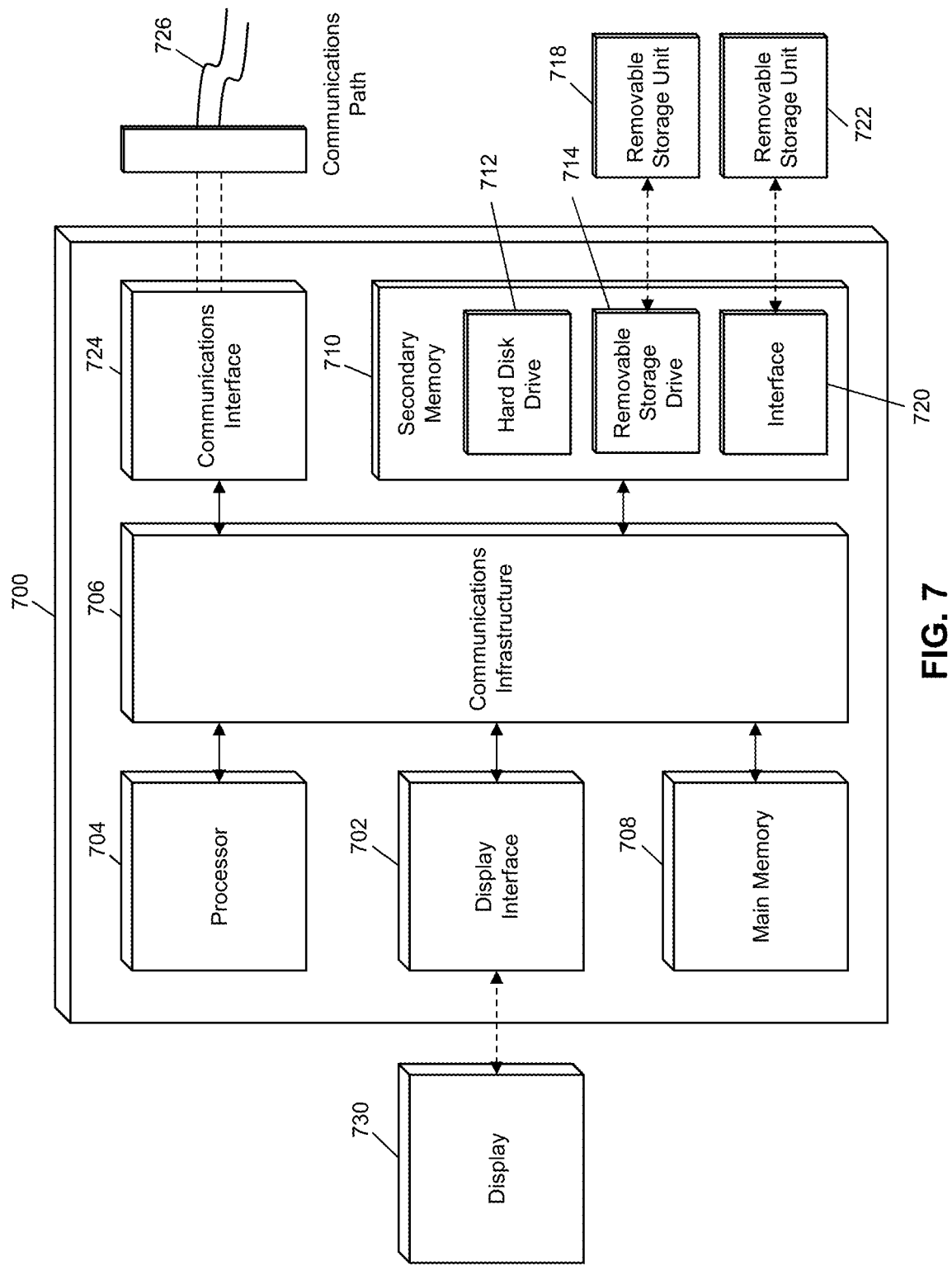
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the processing server 102 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for customized authentication of a subaccount. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for customized authentication of a subaccount, comprising:

storing, in an account database of a processing server, an account profile, wherein the account profile includes a structured data set related to a transaction account including at least a plurality of subaccounts, each subaccount including at least (i) an associated account number, (ii) one or more authentication rules defining the types of authentication that are required to authenticate the respective subaccount when used in an attempted transaction and defines properties of the required types of authentication, and (iii) one or more authentication values, wherein the one or more authentication rules defining the types of authentication are configured to differ from one subaccount to another subaccount;

receiving, by a receiving device of the processing server, a transaction message related to a payment transaction, wherein the transaction message (i) is received from a payment network, via payment rails, which are specially configured infrastructure associated with the payment network, (ii) is formatted based on one or more standards, and (iii) includes at least a plurality of data elements including at least a first data element including a transaction account number and one or more additional data elements including authentication data;

executing, by the processing server, a query on the account database to identify a specific subaccount in the account profile where the associated account number included in the specific subaccount corresponds to the transaction account number included in the received transaction message;

authenticating, by the processing server, the authentication data based on the one or more authentication rules defining the types of authentication and the one or more authentication values included in the identified specific subaccount;

using a result of the authentication, modifying, by the processing server, the transaction message received from the payment network to obtain a modified transaction message, such that the modified transaction message includes the result of the authentication in a data element of the plurality of data elements; and transmitting, by a transmitting device of the processing server, the modified transaction message to a financial institution associated with the related transaction account;

receiving, by the receiving device of the processing server, a subaccount creation request, from a computing device of a consumer, wherein the subaccount creation request includes an account identifier, one or more authentication rules, and one or more authentication values;

identifying, by the processing server, a subaccount number;

executing, by the processing server, a query on the account database to insert a new subaccount including the identified subaccount number and the one or more authentication rules and one or more authentication values included in the received subaccount creation request, wherein the account profile further includes the account identifier; and electronically transmitting, by a transmitting device of the processing server, to the computing device of the consumer, at least the identified subaccount number in response to the received subaccount creation request.

2. The method of claim 1, further comprising:

determining, by the processing server, approval or denial of the related payment transaction based on at least the result of the authentication; and electronically transmitting, by a transmitting device of the processing server, a second transaction message, to the payment network, wherein the second transaction message is formatted based on the one or more standards and includes a plurality of data elements including at least a first data element configured to store a response code, the response code indicating the determined approval or denial.

3. The method of claim 2, wherein the specific subaccount further includes a plurality of transaction controls, the plurality of data elements included in the received transaction message further includes additional data elements configured to store transaction data, and the approval or denial of the related payment transaction is further based on whether the transaction data is in compliance with the transaction controls.

4. The method of claim 2, wherein the transaction message is received from the payment network, and the second transaction message is electronically transmitted to the payment network.

5. The method of claim 1, wherein identifying the subaccount number includes executing, by the processing server, a query on a memory of the processing server to identify an unused account number as the subaccount number.

6. The method of claim 1, wherein identifying the subaccount number includes generating, by the processing server, the subaccount number.

7. A system for customized authentication of a subaccount, comprising:

an account database of a processing server configured to store an account profile, wherein the account profile includes a structured data set related to a transaction account including at least a plurality of subaccounts, each subaccount including at least (i) an associated account number, (ii) one or more authentication rules defining the types of authentication that are required to authenticate the respective subaccount when used in an attempted transaction and defines properties of the required types of authentication, and (iii) one or more authentication values, wherein the one or more authentication rules defining the types of authentication are configured to differ from one subaccount to another subaccount;

a receiving device of the processing server configured to receive a transaction message related to a payment transaction, wherein the transaction message (i) is received from a payment network, via payment rails, which are specially configured infrastructure associated with the payment network, (ii) is formatted based on one or more standards, and (iii) includes at least a plurality of data elements including at least a first data element including a transaction account number and one or more additional data elements including authentication data;

wherein the processing server is configured to:

execute a query on the account database to identify a specific subaccount in the account profile where the associated account number included in the specific subaccount corresponds to the transaction account number included in the received transaction message;

authenticate the authentication data based on the one or more authentication rules defining the types of authentication and the one or more authentication values included in the identified specific subaccount; and using a result of the authentication, modify the transaction message received from the payment network to obtain a modified transaction message, such that the modified transaction message includes the result of the authentication in a data element of the plurality of data elements; and a transmitting device of the processing server transmitting the modified transaction message to a financial institution associated with the related transaction account, wherein the receiving device of the processing server is further configured to receive, from a computing device of a consumer, a subaccount creation request, wherein the subaccount creation request further includes an account identifier, one or more authentication rules, and one or more authentication values, wherein the processing server is further configured to:

identify a subaccount number, and execute a query on the account database to insert a new subaccount including the identified subaccount number and the one or more authentication rules and one or more authentication values included in the received subaccount creation request, and wherein the account profile further includes the account identifier; and a transmitting device of the processing server configured to electronically transmit, to the computing device of the consumer, at least the identified subaccount number in response to the received subaccount creation request.

8. The system of claim 7, wherein:

the processing server is further configured to determine approval or denial of the related payment transaction based on at least the result of the authentication; and a transmitting device of the processing server configured to electronically transmit a second transaction message to the payment network, wherein the second transaction message is formatted based on the one or more standards and includes a plurality of data elements including at least a first data element configured to store a response code, the response code indicating the determined approval or denial.

9. The system of claim 8, wherein the specific subaccount further includes a plurality of transaction controls, the plurality of data elements included in the received transaction message further includes additional data elements configured to store transaction data, and the approval or denial of the related payment transaction is further based on whether the transaction data is in compliance with the transaction controls.

10. The system of claim 8, wherein the transaction message is received from the payment network, and the second transaction message is electronically transmitted to the payment network.

11. The system of claim 7, wherein identifying the subaccount number includes executing, by the processing server, a query on a memory of the processing server to identify an unused account number as the subaccount number.

12. The system of claim 7, wherein identifying the subaccount number includes generating, by the processing server, the subaccount number.

* * * * *